United States Patent [19]

Odone

[11] 3,772,580
[45] Nov. 13, 1973

[54] SYNCHRONIZING SYSTEM TO SYNCHRONIZE THE SPEED OF A DC MOTOR WITH THE FREQUENCY OF A COMMAND PULSE TRAIN

[75] Inventor: Giovanni Odone, Saint-Sulpice, Switzerland

[73] Assignee: Silma S.p.A., Rivoli (Turin), Italy

[22] Filed: Dec. 13, 1971

[21] Appl. No.: 207,291

[30] Foreign Application Priority Data
Dec. 11, 1970 Italy .............................. 71123 A/70

[52] U.S. Cl. ............................................. 318/318
[51] Int. Cl. ............................................ H02p 5/16
[58] Field of Search ..................... 318/318, 314, 327

[56] References Cited
UNITED STATES PATENTS

| | | | |
|---|---|---|---|
| 3,522,503 | 8/1970 | Feulner | 318/314 |
| 3,546,553 | 12/1970 | Loyd | 318/318 |
| 3,628,114 | 12/1971 | Pattantyus | 318/314 |
| 3,546,553 | 12/1970 | Loyd | 318/318 |
| 3,596,005 | 7/1971 | Hamilton | 318/318 |
| 3,154,730 | 10/1964 | Houldin | 318/318 |
| 3,331,006 | 7/1967 | Strand | 318/318 |
| 3,644,813 | 2/1972 | Schoendorff | 318/318 |
| 3,646,417 | 2/1972 | Cassie | 318/318 |

Primary Examiner—Bernard A. Gilheany
Assistant Examiner—Thomas Langer
Attorney—Robert D. Flynn et al.

[57] ABSTRACT

A controlled switch is connected in the power supply of a motor. The ON-OFF time of the controlled switch is determined by a circuit which includes a multi-vibrator which changes state in accordance with the relative rate of occurrence of pulses of the command pulse train and a pulse train proportional to motor speed; a divider circuit is connected to have the command pulse train applied thereto, and divides the frequency thereof by a value of $n$, in which $n \geq 2$, the divided pulse train being applied to trigger the multi-vibrator to set, that is, to cause closing of the controlled switch, the pulses proportional to motor speed being applied to the multi-vibrator to re-set the multi-vibrator, the set-re-set time period of the multi-vibrator controlling the ON-OFF time of the controlled switch. Inhibit circuits can be provided to prevent spurious switching of the bistable multi-vibrator.

11 Claims, 6 Drawing Figures

SYNCHRONIZING SYSTEM TO SYNCHRONIZE THE SPEED OF A DC MOTOR WITH THE FREQUENCY OF A COMMAND PULSE TRAIN

The present invention relates to a system to control the speed of DC motors by a command pulse train, and more particularly to synchronize the speed of a DC motor with the frequency of the command pulse train.

It has been proposed to provide control systems of this kind in which a synchronizing signal, which varies between usually rather narrow limits controls the duration of pulses obtained from a pulse generator driven from the motor. This pulse generator provides pulses of a certain frequency, obtained from a magnetic or photoelectric transducer, secured to the shaft of the motor, the repetition rate of the pulses, that is, their frequency, being proportional to the speed of the motor itself. Usually, the pulse generator includes a monostable multi-vibrator or a circuit which provides such pulses, the duration of the pulse depending on the charge period of a condenser. In such systems, the start of the pulse obtained from the transducer is synchronized with the start of the pulse derived from the outside source, or a command signal.

An electronic switch is provided which is interconnected, usually in series, between the motor and its current supply. This electronic switch is controlled by pulses derived from the control circuit, the duration of the pulses controlling the motor ON-OFF being roughly proportional to the time period between the termination of the pulses derived from the motor (and, hence, proportional to motor speed) and the command pulses. To provide for effective synchronization, the speed of the motor must roughly conform to the speed which it should have, that is, to the speed determined by the synchronizing or command signal. It has been proposed to expand the range of possible control of synchronization by varying the duration of the pulses derived from the pulse transducer (and proportional to motor speed) further, and additionally, in dependence on an additional regulating signal, for example a direct current signal, which bears a relationship of proportionality to the frequency of the command signal, and which is derived by means of a frequency-voltage-analog converter. Such arrangements actually permit obtaining exact synchronization over wider ranges; they do require exact adjustment, however, since a major portion of the circuit is based on an analog relationship, that is, the duration of the pulses of the pulse transducer, for example the charging time of a condenser, is also a function of the value of the condenser itself, the resistance of the charging circuit, and the final voltage to which it is charged. Thus, to provide controllable relationships, all circuit values must be maintained within close tolerances, both under quiescent, as well as under operating conditions. Such circuits additionally require a large number of components, all of them with quite narrow tolerances. This results in an expensive circuit, the reliability of which is not as great as desired.

It is an object of the present invention to provide an electronic circuit to control the speed of direct current motors which can be constructed of readily available components or circuit assemblies and which does not require components or sub-assemblies of extremely high tolerances, and which has improved reliability.

It is an additional object of the present invention to provide a control system for direct current motors in which the command speed may vary within a wide range, without requiring auxiliary circuits to expand the range itself. The system itself should be capable of being built of building blocks including integrated circuits, to improve the cost factor, maintenance, reliability and decrease space and power requirements.

SUBJECT MATTER OF THE PRESENT INVENTION

Briefly, a pulse train is provided forming a command train; the motor is connected to a transducer which provides a motor speed pulse train. The motor circuit has a controlled switch therein, which is energized ON-OFF at varying rates, in order to maintain the speed of the motor constant. The controlled switch is, itself, controlled by an energizing circuit which includes a multi-vibrator which changes state in accordance with the relative rate of occurrence of the pulses of the command pulse train and the motor speed pulse train. When this multi-vibrator is in one state, for example is being set, the switch is caused to be closed; the time duration that the multi-vibrator remains in the set state controls the closing time of the controlled switch. The command pulse train is applied to a divider which divides the frequency of the command pulse train by a value of $n$, where $n$ is a whole number equal to or greater than two (2). The divided pulse output is applied as a set signal to the multi-vibrator, and the motor speed pulse train is applied to the same multi-vibrator as a reset signal. The time duration that the multi-vibrator remained in the set stage is integrated and discriminated and then applied to the controlled switch as a control signal for its open-close time, to thus control its duty cycle.

In accordance with embodiments of the invention, circuits are provided to block, or inhibit application of pulses, or re-setting of the divider if the sequence of pulses applied to the bistable multi-vibrator would, due to operating conditions, not be alternately a divided output pulse, followed by a speed control pulse (from the motor) followed by a divided output pulse and so on.

The invention will be described by way of example with reference to the accompanying drawings, wherein.

The same components shown in the various drawings have been given the same reference numerals and will be described but once. A direct current motor 10 has its armature connected between a source of current, schematically shown as terminal 12, and chassis, or ground 14; terminal 12 is connected to a voltage $+V_0$. An electronic controllable switch 16 is connected in series with the motor 10. The controlled switch 16 may be a power transistor, or a similar semiconductor; it may be, for example, a thyristor, such as a silicon controlled rectifier (SCR) with its own re-set circuit, which is well known in the art and need not be described in detail. The motor may have any desired form, and may be collectorless, the motor being controlled by separate electronic switches, each controlled from a line 42, similar to switch 16.

Figure 1:
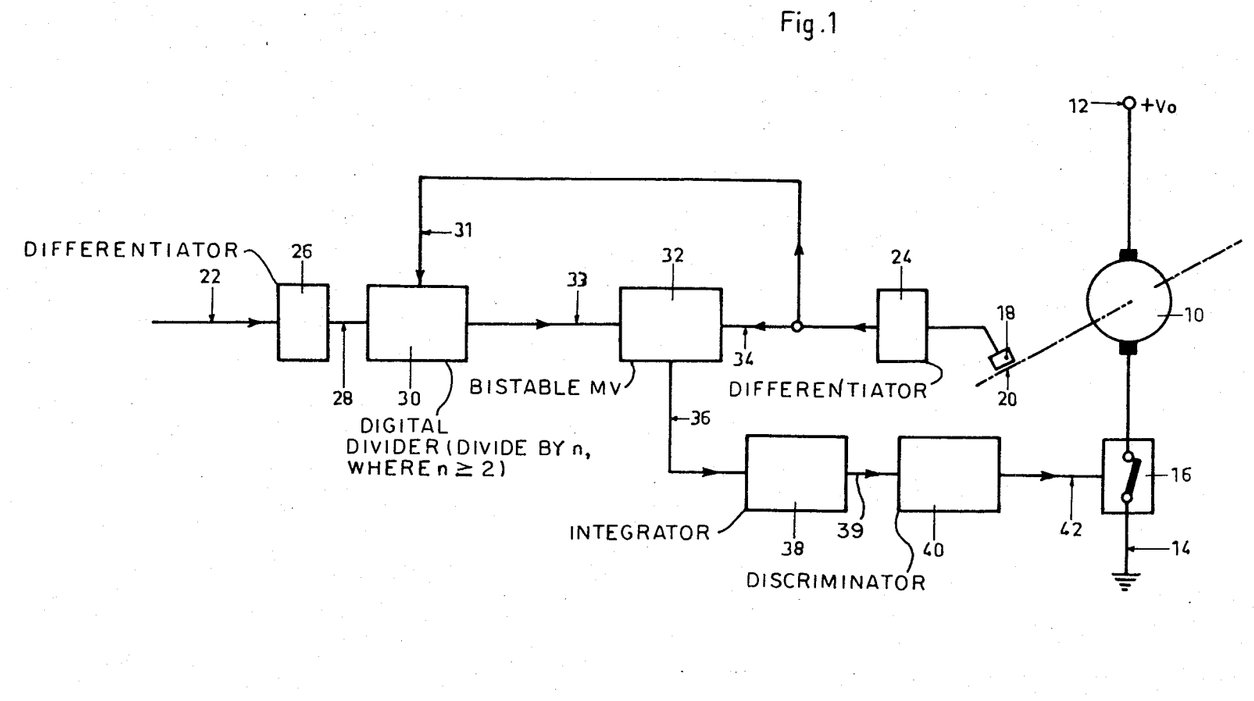
FIG. 1 is a general block diagram of a basic embodiment of the invention.

The motor shaft 20 has a transducer 18 associated therewith, which provides output pulses at a rate proportional to motor speed. This transducer may be an inductance coil, the magnetic circuit of which is changed in accordance with rotation of shaft 20, a photoelectric transducer, or other similar device well known in the art, or a tachometer generator of known construction. The output signal from transducer 18 preferably is of a substantially higher frequency than the speed of the shaft itself; thus, 50 to 100 cycles for each revolution of the motor 10 is suitable in many applications. The frequency of the signal from transducer 18 will be proportional to speed of the shaft 20, and thus of motor 10, and is applied to a differentiator 24.

A command or reference pulse train is applied to the system over line 22, and connected to a differentiator 26. The pulse repetition rate, or frequency of the command pulse train at line 22 is usually a whole multiple of the frequency of the signal 18, when the motor is in synchronism with the pulse repetition rate (PRR) of the command pulse train. The multiple, n may be equal to two (2), or much higher, in the example below, a multiple of eight is chosen. For ease of construction of electronic components, the multiples preferably are even multiples and, especially, multiples which are powers of two.

Differentiators 24, 26 differentiate the signals to provide sharply peaked needle pulses. The sharply peaked needle pulses from differentiator 26, and having the PRR of the command pulse train at line 22 are applied to input line 28 of a digital divider 30, in which the pulse trains are divided by the value $n$. The digital divider operates identically with a usual binary counter, of standard and known construction. A reset terminal 31 is provided. The usual dividers, which are commercially available, customarily have a reset input, and re-setting, or return to the initial state of the counter is obtained by applying a signal to the reset terminal, which returns the counter to its original state.

The output of digital divider 30 is applied to one input, for example the SET input of a bistable multi-vibrator 32. The other input line 34 of the bistable multi-vibrator resets the circuit 32. The input line 34 is connected to the output of differentiator 24, that is, it has the wave shaped, needle pulses from transducer 18 applied thereto, so that the input 34 has a pulse train at a PRR corresponding to motor speed applied.

Re-setting of the divider 30 is obtained over line 31 which is connected to the output of differentiator 24, that is, digital divider 30 is re-set upon occurrence of a pulse from transducer 18. The re-setting of the divider 30 has the effect that the time period between the occurrence of a pulse from transducer 18 and the occurrence of a pulse at the output of the divider 31 is equal to $n$ pulse recurrences of the frequency of the synchronization, or command signal.

Figure 2:
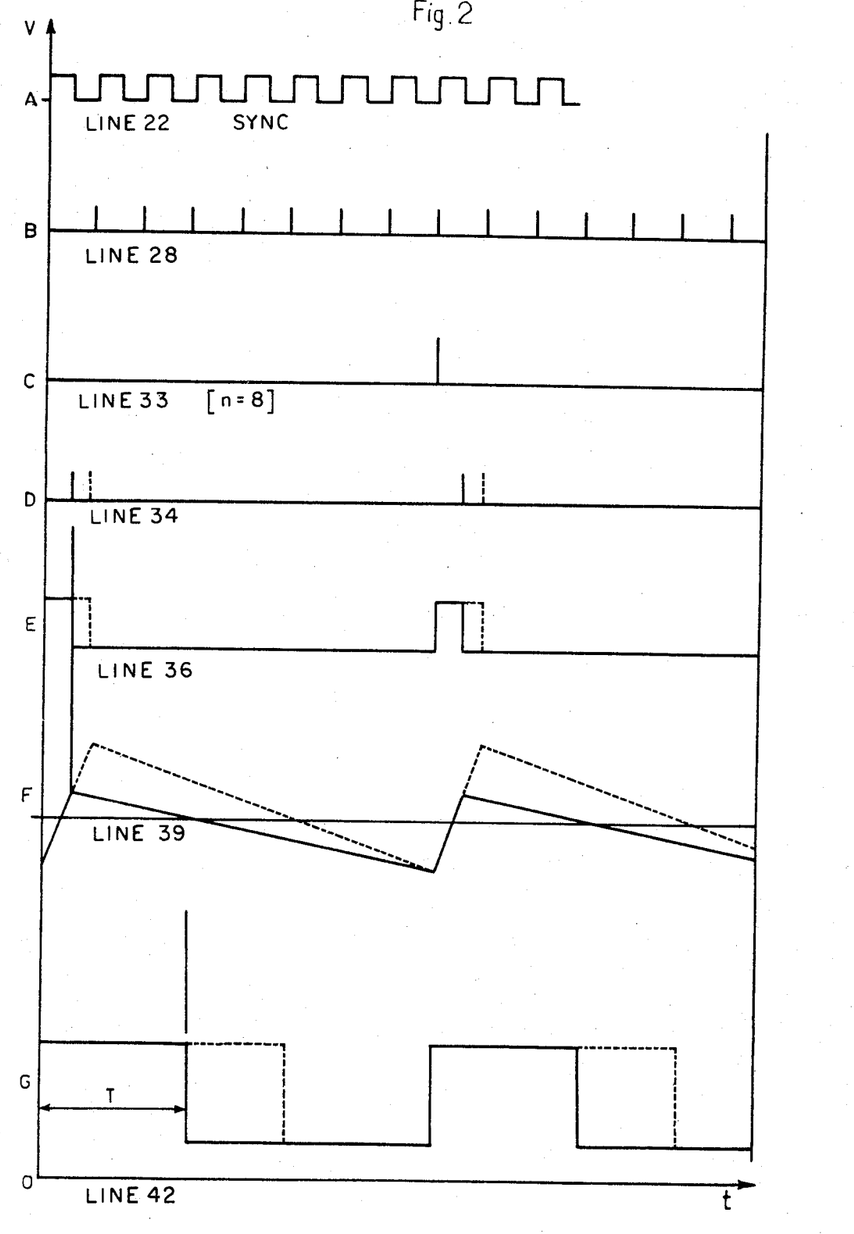
FIG. 2 is a graphic representation of wave forms arising at various points of the apparatus of FIG. 1.

The signals are shown in FIG. 2, in their order of occurrence; in the chosen example, $n = 8$, that is, the relationship between the PRR of the command signal and that of the transducer 18 is 8 : 1.

In the Figure, graph A illustrates a type of pulse train forming the command or synchronization signal, applied at line 22. After differentiating in differentiator 26, the signal at line 28 is illustrated in graph B. Dividing by 8 provides an output signal from the digital divider 30 as illustrated in graph C. This signal is applied as the SET input to the bistable multi-vibrator 32.

The output from transducer 18, after differentiation in differentiator 24 and appearing on line 34 is shown in graph D. The solid line in graph D shows the occurrence of the signals upon average loading of the motor; the dashed line in graph D shows the occurrence of the same signal upon increased loading of the motor. Graph E illustrates the output signal of the bistable multi-vibrator circuit 32, which appears on line 36. As can be clearly seen, circuit 32 is SET upon occurrence of a pulse on line 33, and re-set upon occurrence of a pulse at line 34. The pulse width is determined by the time delay between the pulses of line 33 and line 34; if the motor is loaded to a greater extent, so that the speed decreases (dashed pulses at graph D), the pulses at graph E will be wider.

The output of multi-vibrator, 32, appearing at line 36, is applied to an integrator 38; the output of integrator 38 is applied to the input line 39 of a discriminator 40, which is connected to the input 42 of the controlled switch 16. The integrated output, appearing at line 39 is indicated in graph F. As is clearly apparent, when the pulse to the integrator is longer, the integrator itself will operate at a higher level and provide a longer output pulse to discriminator 40 which, again, will apply a longer output signal to the controlled switch 16, so that, if a greater loading occurs on the motor, tending the motor to slow down, the duty cycle of switch 16 will be increased, that is, more current will be permitted to be passed to the motor over an extended time interval, thus causing the motor to speed up and return to synchronism with the command signal on line 22. The time T, as appears on graph G on FIG. 2, thus illustrates the time during which the motor is supplied with power. The dashed and solid lines in the graph E, F and G have the same significance as in the graph D.

When the motor 10 and the command signal are in synchronism, re-setting the divider 30 to zero does not change the condition of the divider itself, since it is carried out during a period of time which occurs between the output pulse of the divider and the subsequent following pulse of the command or synchronization signal. During this time, the divider can readily be switched. If the divider is a regular counter, of the ring type which has an automatic re-set after a certain number of counts, for example eight, the re-set circuit to the divider itself is not necessary when motor, and command signal are in essential synchronism. Re-setting is necessary, however, during the start-up of the motor, or if the motor loses substantial synchronism with the command signal. If there is a great difference in speed between the motor, as reflected in the PRR of the transducer 18 and the PRR of the command signal at line 22, controlled re-setting of the digital divider 30 insures proper sequencing of pulses being applied to the bistable multi-vibrator 32. If, due to some reason or other, the signal from transducer 18 should occur before the output pulse of the divider 30 arrives, then the divider will be re-set automatically to zero and the next pulse will be supplied only when that period of time has elapsed which corresponds to n pulses, or cycles of the input signal at line 22. Thus, the bistable multi-vibrator (MV) 32 remains in the re-set, or zero position for longer periods of time, during which also current supply to the motor is interrupted.

Integration and subsequent discrimination in amplitude of the signals on line 36 must be so carried out that the motor can, under maximum loading condition, be supplied with maximum power. This condition obtains when the duration of the output pulse of the bistable multi-vibrator corresponds to one cycle of the synchronization frequency. This consideration limits the relationship n between the synchronization frequency and the frequency of the motor speed signal, delivered by transducer 18, to a maximum value, when the motor is in synchronous operation. If the pulse of the transducer 18 would arrive in a time period which lies between the first and the second pulse of the synchronization frequency (on line 22), then re-setting of the counter would erase storage of the first synchronization pulse, and the divider would then divide not by eight, but divide by nine and thus the speed of the motor would be decreased in accordance with the relationship:

$$n/n + 1 \tag{1}$$

In the foregoing example, the relative pulse order has been counted from a preceding output pulse of the divider.

The apparatus as described operates satisfactorily, but may, under certain operating conditions, have more than one stable point of equilibrium, of which one does not correspond to synchronous operation.

If motor 10 has, for example, a slightly higher speed than the speed which would correspond to synchronization with the signal on line 22, then it may occur that in a certain instant of time, a pair of subsequent pulses are generated by the transducer 18 which are applied to the bistable multivibrator 32, without an intervening output pulse from the divider 30 having been applied to the bistable MV. The second one of these pulses from transducer 18 will re-set the divider 30 to zero before the divider could carry out its division, that is, before the nth pulse of the synchronization or command signal has been applied to its input. As a result, the output pulse of the divider 30 is suppressed and divider 30 starts to count, or divide anew. If the re-set to zero occurs between the $n + (n - 1)$ pulse and the 2nth pulse, then the divider will count, as a first pulse, the $2n^{th}$ which, however, should have been the zero pulse of the next sequence.

Consequently, the next output pulse of the divider 30 will be one ahead of the pulse which it should have and, if as has been assumed, the speed of the motor 10 is only slightly higher than that corresponding to synchronism, the pulse from transducer 18 will follow at a time which is erroneous, and causes the motor to advance even more. Eventually, the motor would be supplied once each occurrence of $n + (n - 1)$ pulses of the command signal; the time during which this would occur will depend on the integration time constant, the inertia and response characteristics of the entire loop and system, including the motor, and the discriminator characteristics.

This erroneous stable state which does not correspond to synchronous operation can be eliminated by suppressing the pulse of the synchronization signal which occurs after a pulse from transducer 18 arises, so that the output pulse from the divider 30 does not advance. This, then, suppresses the nth pulse of the command signal, so that it cannot be counted as a pulse of rank, or order one. As a result, the motor 10 will not have power supplied thereto until its speed has dropped to that of synchronous speed.

Figures 3, 5:
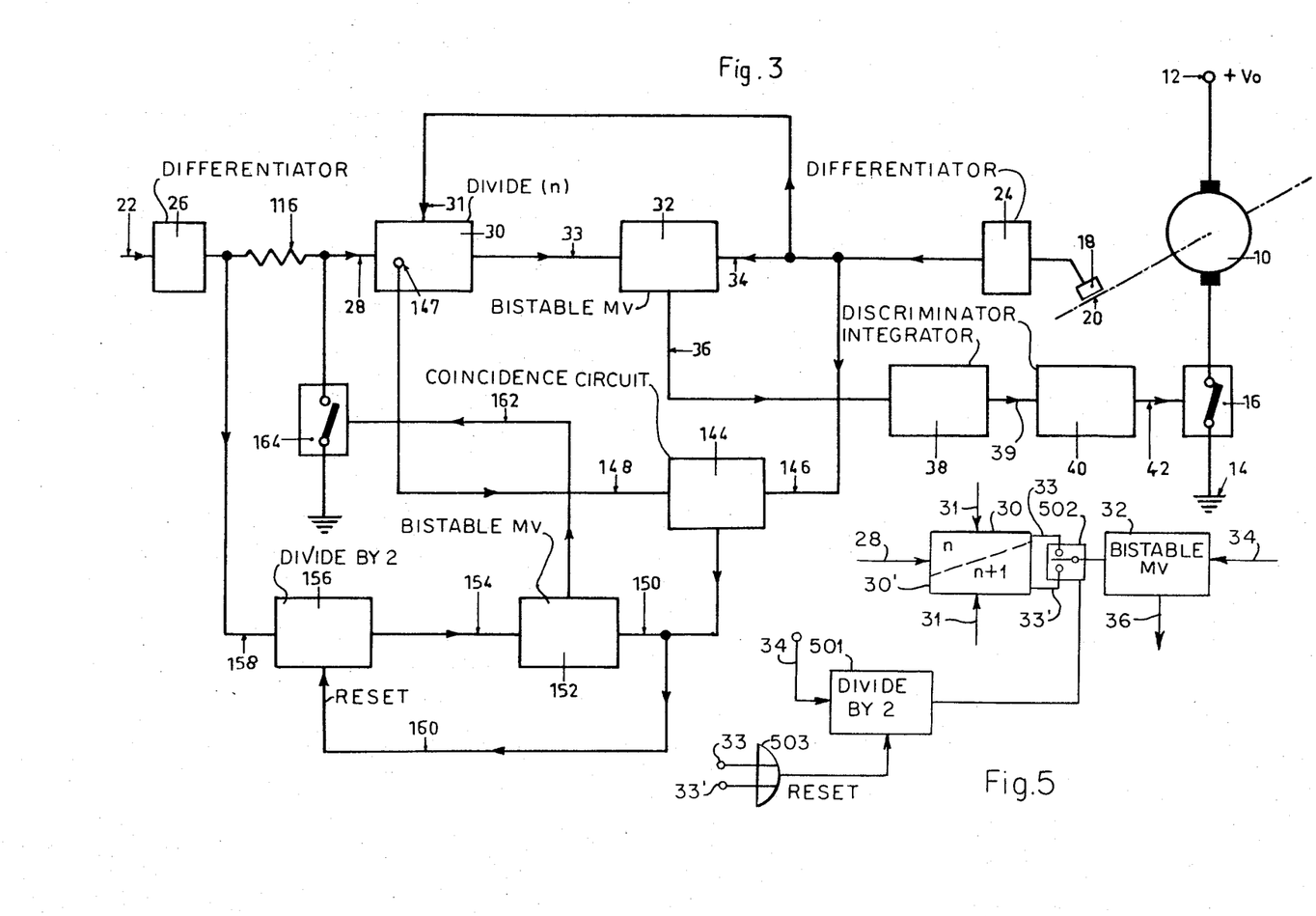
FIG. 3 is a block diagram of a modified embodiment of the system of the invention.
FIG. 5 is a fragmentary diagram illustrating one way of interconnecting the divider circuit.

FIG. 3 illustrates a circuit which solves the problem referred to. The same circuit of FIG. 1 is used (and will not be described again) and in addition thereto a coincidence circuit 144 is provided which has a pair of inputs 146, 148. Input 146 is controlled from the transducer 18 (over differentiator 24) and input 148 is derived from the output signal of the digital divider 30. The coincidence circuit tests an output from the last stage of digital divider 30, such as terminal 147, and in case of simultaneous occurrence of pulses, the coincidence circuit 144 provides an output pulse to the input 150 of a bistable multi-vibrator 152, which has a second input 154 to which the output of a divide-by-two circuit 156 is applied. Circuit 156 is controlled from the command input signal 22, derived from differentiator 26, and appearing on a line 158. Circuit 156 is re-set over a line 160 connected to the output 150 of the coincidence circuit. The output signal of the bistable multi-vibrator 152 controls, over line 162, a controlled electronic switch 164 which is connected between the input 28 of the digital divider 30 and ground, to inhibit application of pulses to the circuit 30. Resistance 116 is a de-coupling resistance, to de-couple line 158 from the electronic switch 164.

Operation: The pulses from transducer 18 (over differentiator 24) are applied to the coincidence circuit 144; the coincidence circuit 144 thus receives information whether a pulse from transducer 18 occurs earlier, simultaneously with or later than a pulse from divider 30. Coincidence circuit 144 utilizes the relationship between pulses from transducer 18 on line 146 and the voltage at one of the outputs 147 of the last stage of the divider circuit 30. Coincidence causes bistable MV 152 to set, that is, to be triggered, the output of which closes switch 164 which short-circuits, or inhibits application of the command signal to divider 30. Simultaneously, the coincidence signal re-sets the divide-by-two circuit 156 to zero. The electronic switch 164 remains closed until two subsequent pulses of the command signal are applied, the second one providing an output pulse to the divide-by-two circuit 156 which again triggers bistable MV 152 which changes state and causes re-opening of the electronic switch 164.

Coincidence circuit 144 could be replaced by a divider, dividing by two, the input of which has pulses applied thereto which are connected to the transducer 18, and which has a reset controlled by the digital divider 30. If, at its input, two pulses from the transducer 18 are applied to this circuit, and no output signal from the digital divider 30 was interposed, the divide-by-two circuit will provide a signal at its output which triggers the bistable MV 152 in the same manner as previously described. In effect, then, such an additional divide-by-two circuit tests for alternation of sequences of signals on lines 33 and 34.

A similar result can be obtained by utilizing a pair of dividers, one dividing by $n$ and the other by $n + 1$, the outputs of which are electronically switchable. If sequential pulses are obtained from transducer 18, without a pulse from divider 33 being interspersed, then the aforementioned switch-over circuit applies to the input of the bistable multi-vibrator 32 only that output signal of the divider which is divided by $n + 1$. The output pulse of this $n + 1$ divider circuit controls re-setting of the bistable multi-vibrator, so that the input to bistable multi-vibrator 32 can, again, be connected with the output of the divider 30 for the next subsequent cycle. Re-setting to zero of the two dividers is controlled, normally, by the pulse which is derived from transducer 18 through the differentiator 24, that is, over line 31 as shown in FIG. 1.

FIG. 5 illustrates a combination of a divide-by-two circuit 501 which has outputs from the transducer 18, over differentiator 24 applied thereto, as schematically indicated by terminal 34. The divide-by-two circuit is re-set by the output of the digital divider 30, for example from line 33. The output of the divide-by-two circuit 501 controls switch-over of a pair of digital dividers 30 (division ratio $n$) and 30' (division ratio $n + 1$), each one re-set by reset line 31. The output from the two dividers 30, 30' (which may, physically, be the same units tapped at different points) are connected to a transfer switch 502 which connects to the bistable multivibrator 32, as described. The divide-by-two circuit 501 is re-set either from line 33 (output of digital divider 30) or line 33' (output of digital divider 30'), applied through an OR gate 503.

Figure 4:
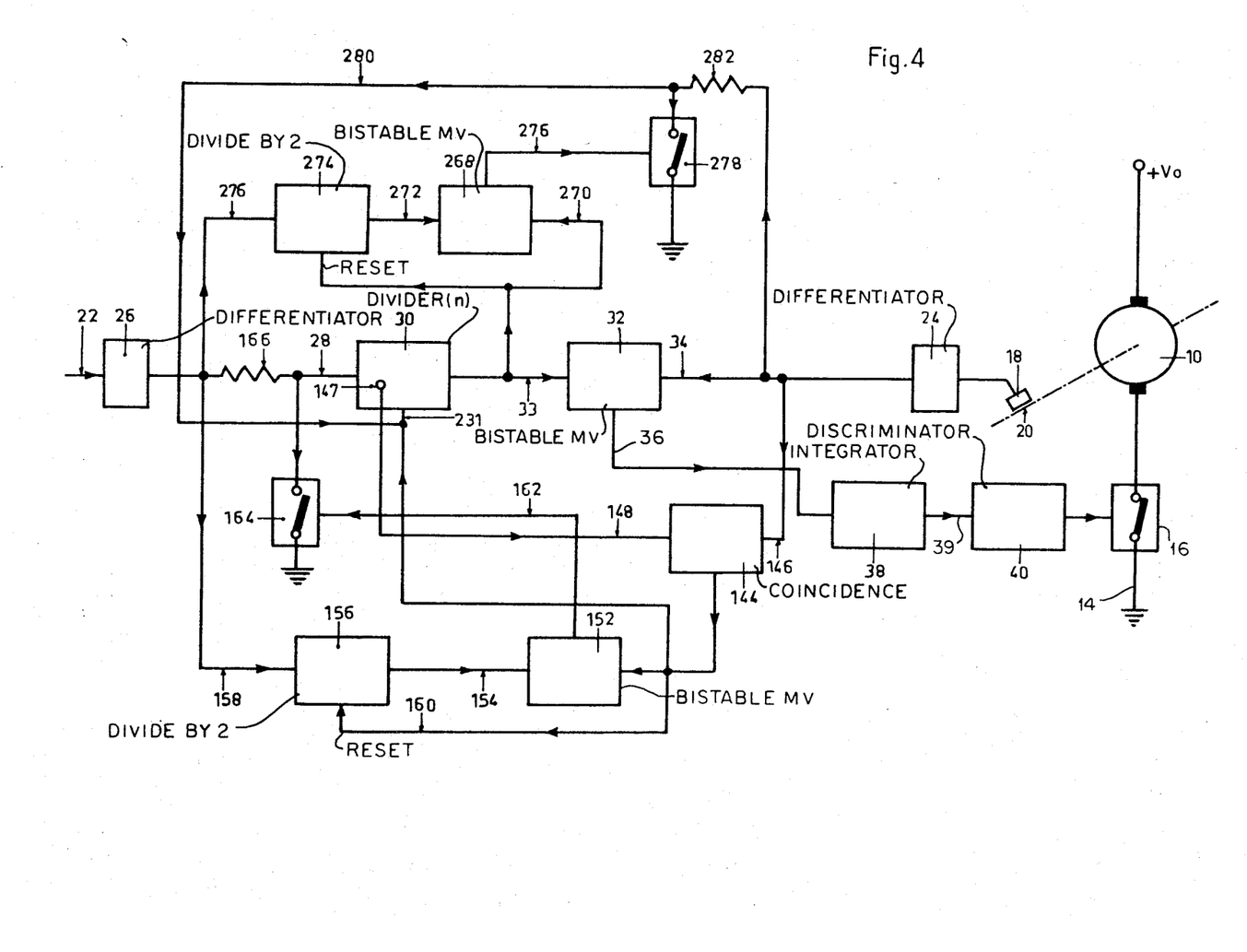
FIG. 4 is a block diagram of yet another modification of the invention.

Start-up time of the apparatus can be decreased when the divider 30 is not re-set to zero if the signal from transducer 18 arrives in a time duration which occurs between the period of the output of the divider 30 and the second next pulse of the command signal. FIG. 4 illustrates an arrangement in which the reset to zero is blocked, in order to decrease the initial phase of the operation. The arrangement in accordance with FIG. 4 contains all the components as previously described in connection with FIG. 3 (or, in the variation of FIG. 5). Additionally, a bistable multi-vibrator 268 is provided, having one input line 270 controlled from the output of the digital divider 30. The other input of bistable MV 268 is controlled from a line 272 which has the output signal of a divide-by-two circuit 274 applied thereto. The circuit 274, in turn, is controlled from line 276 connected to the input of the command signal, behind differentiator 26. The divide-by-two circuit 274 is re-set by the output of the digital divider 30. The output signal of the bistable MV 268 controls, over line 276, electronic switch 278 which, when it is closed, short-circuits the reset signal to the digital divider 30, appearing at input terminal 231 thereof, and being conducted over a line 280. A decoupling resistor 282 is included in the line to decouple the input 34 of the bistable MV 32 from the line 280, and the reset terminal of the digital divider 30.

Operation of modification of FIG. 4: The output signal of the digital divider 30 triggers the bistable MV 268 which causes closing of switch 278, and simultaneously re-setting of divide-by-two circuit 274. The second pulse to the input of the circuit 274 causes an output at line 272, and thus switching of the bistable MV 268, which opens switch 278.

Figure 6:
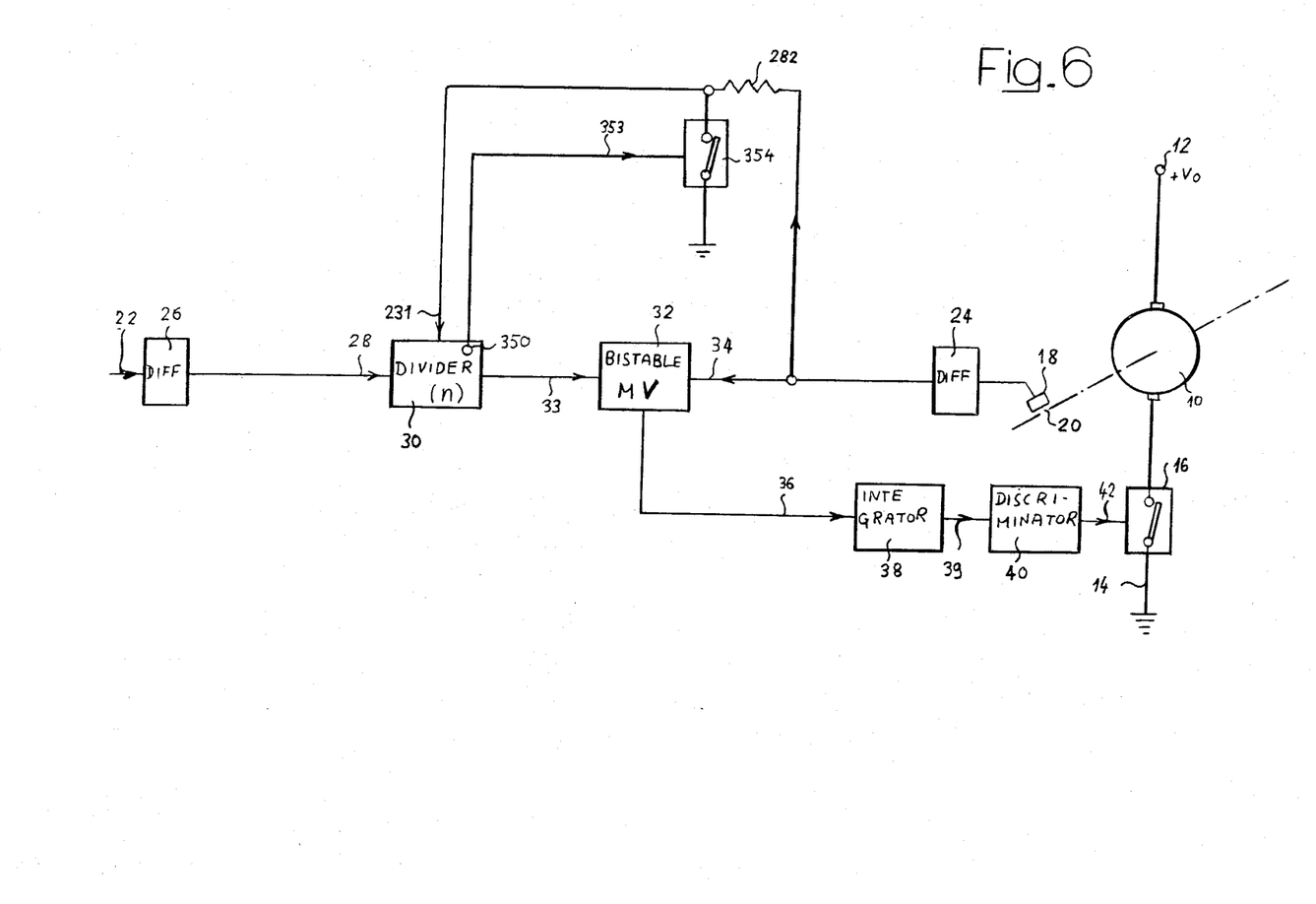
FIG. 6 is a block diagram comprising an inhibit circuit.

FIG. 6 illustrates an other arrangement in which the reset to zero of the divider 30 is blocked during the initial phase of the dividing operation. Most of the components shown in FIG. 6 bearing the same numbers as in FIG. 1, FIG. 3, FIG. 4 and FIG. 5; and have the same functions as previously described. Additionally a connection 353 is provided between an output 350 of one of the dividing stages of the divider 30 and the electronic switch 354. This output 350 may have a different bias during a first predetermined number of command pulses applied to the divider 30 after the divider had been in its original state, and the bias it has during the dividing operation of the subsequent command pulses reaching the divider. It is obvious, that the connection 353 fulfills the same function as the network comprising 274, 272, 268 and 276 in FIG. 4. Operation: The bias on connection 353 will close the electronic switch 354 during the first part of the dividing operation and thus block the motor speed pulses during that period of time.

The switch 354 will be opened, through a different bias on connection 353 after a certain number of command pulses have been applied to the divider. This number of pulses is fully determined by the choice of the output 350 of the divider 30 to which the suitable stage is connected.

The operation of the motor can be changed by changing the number $n$ through which the pulse trains of the command signals are divided in the digital divider 30. It is also possible to control two, or more motors, having similar output transducers, by the same synchronization or command signal, with the motors having relatively proportional speeds, the relationship being $n/m$, in which $m$ is that number by which the divider of the synchronization system for the second motor divides the input pulse trains.

Various changes and modifications may be made within the inventive concept. The circuit components, illustrated in block form, are all well known and readily available as in commercial articles of electronic circuitry. Specific circuits, and construction and details can be found by reference to the appropriate chapters, as indexed, in various textbooks:

The logic elements and components shown in the drawings and utilized by the apparatus of the present invention are known in the art and described and referenced in various publications for example in the books:

"Transistor Manual," published by the General Electric Company, Syracuse, New York;

"Basic Theory and Application of Transistors," Department of the Army Technical Manual, TM 11-690;

"High Speed Computing Devices" McGraw Hill Book Co., 1950;

"Pulse and Digital Circuits," Millman and Taub, McGraw Hill Book Co., 1956;

"Transistor Electronics," Dewitt and Rosoff, McGraw Hill Book Co., 1957;

"Arithmetic Operations in Digital Computers," R.K. Richards, D. Van Nostrand Company, 1955;

"Digital Computer Components and Circuits," R.K. Richards, D. Van Nostrand Company, 1957;

"Design of Transistorized Circuits for Digital Computers," A, I. Pressman; John F. Ryder, Publisher, Inc., New York, 1959;

"Analog and Digital Computer Technology," Norman R. Scott, McGray Hill Book Co., 1960;

"Principles of Control Systems Engineering," Vincent del Toro, Sydney R. Parker; McGraw Hill Book Co., 1960;

"Electronics Devices and Circuits," Jacob Millman, Christos C. Halkias; McGraw Hill Book Co., 1967.

I claim:

1. Synchronization system to synchronize the speed of a DC motor (10) with the frequency of a command pulse train (22; FIG. 2: A) comprising means (18, 20) generating a motor speed pulse train (34; FIG. 2: D) having a repetition rate representative of motor speed;

controlled switch means (16) connecting the motor to a source of power (12, 14); and a motor energization control circuit for said controlled switch means (16) to determine relative opening and closing periods of said controlled switch means comprising a bistable multivibrator (32);

a control circuit for said multivibrator (32) to trigger said multivibrator to change state, said bistable multivibrator control circuit including a divider (30) connected to have said command pulse train applied thereto and dividing the frequency thereof by a value of $n$, where $n$ is a whole number equal to or greater than two, and having a divided pulse output (33, FIG. 2: C) upon completion of division, said divider having a second input connected to said motor speed pulse train, the pulses thereof resetting the divider to its original state, to recommence dividing subsequent command pulses said divided pulse output of said divider (30) being applied to said bistable multivibrator (32) to trigger the multivibrator (32) to change state, the multivibrator being connected to and controlled by the motor speed pulse train to change to its original state from the state to which it had been triggered by said divided pulse output; and a connection circuit (38, 40) connecting the output of the multivibrator (32) and the controlled switch (16), said connecting circuit including an integrator (38) connected to said multivibrator (32) and providing an output which is a function of the time said multivibrator (32) is in said changed state, and means (40) responsive to a predetermined integration level controlling the closing time of said switch (16) to thus control the duty cycle of power applied to the motor.

2. System according to claim 1, wherein the number $n = 2$.

3. System according to claim 1, wherein the number $n = 8$.

4. System according to claim 1, wherein the number $n$ is variable.

5. System according to claim 1, wherein the divider is a digital divider.

6. System according to claim 1, wherein the divider is a digital divider having two outputs at different counts, said two outputs being alternately connectable to said one input of said bistable multivibrator (32).

7. System according to claim 1, additionally comprising inhibit means (144, 152, 164) connected to said divider and further connected to have the motor speed pulse train applied thereto, the inhibit means having its output connected to said command pulse train and inhibiting application of pulses to the divider (30) unless the divider pulse output is followed by a pulse from the motor speed pulse train.

8. System according to claim 1, additionally comprising inhibit means (354) connected (353) to an output (350) of said divider (30);

the said output of the divider carrying a signal related to the number of command pulses stored in the division stages of the said divider and said signal acting on the inhibit means (354) and thereby inhibitting the motor speed pulses to reset the said divider (30) unless a predetermined number of command pulses habe been applied to the divider after that divider had been in its original state.

9. System according to claim 1, additionally comprising coincidence means (144) having said motor speed pulse train and pulses representative of said command pulse train applied thereto, the output of said coincidence circuit being connected to said divider (30) to inhibit application of the command pulses to said divider if a subsequent motor speed pulse occurs without an intervening divided pulse being delivered from said divider, so that change of state of said multi-vibrator (30) will always be commanded and controlled by the sequence: divided pulse — motor speed pulse — divided pulse — . . . . and so on.

10. System according to claim 1, additionally comprising blocking means (268, 274, 280) connected to said divider (30); counter means (274) having said command pulses applied thereto;

and means (278, 280) controlled by said blocking means and inhibiting motor speed pulse train to reset said divider (30).

11. System according to claim 1, additionally comprising means sensing whether the sequence of pulses applied to said bistable multi-vibrator (32) is alternately: divided pulse output pulses and motor speed pulses, said means comprising a divide-by-two circuit (501) having said motor speed pulses applied thereto;

and a reset connection for said divide-by-two circuit (501) connected to the output of the divider (30);

and means controlled by the output of said divide-by-two circuit to modify the input applied to said bistable multivibrator and triggering said multivibrator into said one state.

* * * * *